United States Patent
Marlow

(10) Patent No.: US 9,418,074 B2
(45) Date of Patent: Aug. 16, 2016

(54) SYSTEM AND METHOD FOR UPDATING A SEARCH RESULTS PAGE IN RESPONSE TO A USER MAP INTERACTION

(75) Inventor: Keith A. Marlow, Galston (AU)

(73) Assignee: EXCALIBUR IP, LLC, Sunnyvale, CA (US)

( * ) Notice: Subject to any disclaimer, the term of this patent is extended or adjusted under 35 U.S.C. 154(b) by 0 days.

(21) Appl. No.: 13/340,967

(22) Filed: Dec. 30, 2011

(65) Prior Publication Data

US 2012/0136894 A1 May 31, 2012

Related U.S. Application Data

(63) Continuation of application No. 11/982,141, filed on Oct. 31, 2007, now Pat. No. 8,108,416.

(51) Int. Cl.
*G06F 7/00* (2006.01)
*G06F 17/30* (2006.01)

(52) U.S. Cl.
CPC .... *G06F 17/30241* (2013.01); *G06F 17/30864* (2013.01); *G06F 17/30867* (2013.01)

(58) Field of Classification Search
CPC ............ G06F 17/30864; G06F 17/3087
USPC .......................................... 707/763
See application file for complete search history.

(56) References Cited

U.S. PATENT DOCUMENTS

| | | | | |
|---|---|---|---|---|
| 6,629,136 B1 * | 9/2003 | Naidoo | ............ | 709/219 |
| 7,437,370 B1 * | 10/2008 | Ershov | | |
| 7,624,101 B2 * | 11/2009 | Lin et al. | | |
| 7,966,321 B2 * | 6/2011 | Wolosin et al. | ............ | 707/728 |
| 2002/0174124 A1 * | 11/2002 | Haas et al. | ............ | 707/100 |
| 2003/0061211 A1 * | 3/2003 | Shultz et al. | ............ | 707/3 |
| 2003/0069878 A1 * | 4/2003 | Wise | ............ | 707/3 |
| 2003/0225725 A1 * | 12/2003 | Miller et al. | ............ | 707/1 |
| 2003/0233224 A1 * | 12/2003 | Marchisio et al. | ............ | 704/4 |
| 2004/0073538 A1 * | 4/2004 | Leishman et al. | ............ | 707/3 |
| 2005/0034062 A1 * | 2/2005 | Bufkin et al. | ............ | 715/512 |
| 2005/0273346 A1 * | 12/2005 | Frost | ............ | 705/1 |
| 2006/0200490 A1 * | 9/2006 | Abbiss | ............ | 707/102 |
| 2006/0271281 A1 * | 11/2006 | Ahn et al. | ............ | 701/208 |
| 2006/0271517 A1 * | 11/2006 | Deloach | ............ | 707/3 |
| 2007/0011150 A1 * | 1/2007 | Frank | ............ | 707/4 |
| 2007/0042790 A1 * | 2/2007 | Mohi et al. | ............ | 455/456.5 |
| 2007/0043702 A1 * | 2/2007 | Lakshminarayanan et al. | .. | 707/3 |
| 2007/0112735 A1 * | 5/2007 | Holloway et al. | ............ | 707/3 |
| 2007/0168121 A1 * | 7/2007 | Adachi | ............ | 701/208 |
| 2007/0281690 A1 * | 12/2007 | Altman et al. | ............ | 455/435.1 |
| 2008/0076448 A1 * | 3/2008 | Bartkowski | ............ | 455/456.1 |
| 2008/0077559 A1 * | 3/2008 | Currie et al. | ............ | 707/3 |
| 2008/0098090 A1 * | 4/2008 | Geraci et al. | ............ | 709/219 |
| 2008/0154489 A1 * | 6/2008 | Kaneda et al. | ............ | 701/201 |
| 2009/0063565 A1 * | 3/2009 | Abhyanker | ............ | 707/104.1 |

(Continued)

*Primary Examiner* — Mark E Hershley
(74) *Attorney, Agent, or Firm* — Pillsbury Winthrop Shaw Pittman LLP

(57) ABSTRACT

The present invention is directed towards systems and methods for updating a search results page in response to user interaction with a map resource. The method of the present invention comprises receiving a first search results page in response to a search query comprising at least a first map resource. The method monitors a change in position of a map resource in response to a user interaction and calculates a location corresponding to a map position. The method then re-executes at least one search query based upon said calculated location and displays a second search results page comprising a plurality of updated search results.

21 Claims, 6 Drawing Sheets

(56) References Cited

U.S. PATENT DOCUMENTS

| | | | |
|---|---|---|---|
| 2009/0106681 A1* | 4/2009 | Gupta et al. | 715/771 |
| 2009/0172031 A1* | 7/2009 | Moribe et al. | 707/104.1 |
| 2009/0177381 A1* | 7/2009 | Taniguchi et al. | 701/208 |

* cited by examiner

SYSTEM AND METHOD FOR UPDATING A SEARCH RESULTS PAGE IN RESPONSE TO A USER MAP INTERACTION

This application is a continuation of and claims priority to U.S. patent application Ser. No. 11/982,141 filed on Oct. 31, 2007. This disclosure is hereby incorporated by reference herein in its entirety.

FIELD OF INVENTION

The invention disclosed herein relates generally to updating a user search query based on user interaction with a map resource. More specifically, the present invention is directed towards systems and methods for dynamically updating a search engine results page based on the interaction of a user with a map resource by parsing the current query string and replacing a location string with a newly selected location string.

BACKGROUND OF THE INVENTION

The widespread popularity of asynchronous JavaScript and XML ("AJAX") enabled web applications has spawned numerous techniques for enhancing the user experience, primarily through interactivity and performance gains inherent in the technology. The use of AJAX and map technology has been a highly utilized example of the technology. A user interface that is quick and allows dragging of the map allows developers to incorporate existing data (such as business listings, directions, etc) onto the AJAX platform with a substantial increase in user-friendliness and load times.

The inclusion of AJAX map widgets onto federated search result pages has added another layer of depth to existing federated result search pages, allowing users to see the search results on the map. The prior art techniques, however, lack the ability to use the map as a search device. In other words, a user mug re-enter searches, causing a redraw of the map he or she is looking at. For example, a user may search for restaurants in New York City and be presented with a plurality of matches shown on a map resource. If the user wishes to search, for example, for restaurants in Brooklyn, the user must enter a search query such as "restaurants in Brooklyn, N.Y." and re-execute a query. Upon re-execution of the query, the map is redrawn.

Other mapping systems known in the art allow for use of a map in constructing searches, but have significant drawbacks. Using such system, a user may conduct a search for pizza restaurants in a given geographic location, which generates an overlay on the map with an indication of the locations of the relevant businesses. When the user moves the map to view a subsequent geographic location, the user's interaction with the map must be suspended to select a control to reinitiate the search using the latitude and longitude of the subsequent geographic location. Furthermore, by relying solely on longitude and latitude in conducting a subsequent search at the subsequent geographic location, the subsequent search is limited to data sources that comprise longitude and latitude information, thereby excluding other, relevant data sources over which to conduct the subsequent search.

This re-execution breaks the flow of interaction with the map resource and introduces a noticeable lag in program execution time. Thus, there is a need in the art for a system and method for dynamically updating a plurality of search results on a map resource in response to user interaction with the map resource.

SUMMARY OF THE INVENTION

The present invention is directed towards systems and methods for updating a search results page in response to user interaction with a map resource. The method of the present invention comprises receiving a first search results page in response to a search query (in one embodiment, a search query comprises search content and a location) comprising at least a first map resource. In one embodiment, a search results page comprises a federated search page comprising a plurality of search results from a plurality of search databases. In an alternative embodiment, a first map resource comprises a graphical map comprising a plurality of search result location markers.

The method monitors a change in position of a map resource in response to user interaction and calculates a location corresponding to a map position. In one embodiment, calculating a location comprises translating a latitude, longitude and zoom factor to an address. In an alternative embodiment, the method further comprises transmitting said calculated map position to a first search results page. The method then re-executes at least one search query based upon said calculated location. In a first embodiment, re-executing at least one search query comprises parsing said search query to extract search content and updating a location with said calculated location. Additionally, alternative embodiments exist wherein re-executing at least one search query is performed asynchronously.

The method then displays a second search results page comprising a plurality of updated search results. In one embodiment, displaying a second search results page comprises displaying an updated graphical map comprising a second plurality of search result location markers. In an alternative embodiment, displaying a second search results page comprises displaying a plurality of updated federated search widgets.

The present invention is further directed towards a system for updating a search results page in response to user interaction with a map resource. The system of the present invention comprises a client device coupled to a network operative to receive a first search results page in response to a search query (in one embodiment, a search query comprises search content and a location) comprising at least a first map resource.

The map resource is operative to monitor a change in position of a map resource in response to a user interaction; a map resource may comprise a graphical map comprising a plurality of search result location markers. In one embodiment, calculating a location comprises translating a latitude, longitude and zoom factor to an address. In one embodiment, a search results page comprises a federated search page comprising a plurality of search results from a plurality of search databases.

The system further comprises a content provider coupled to said network comprising a reverse geocoder operative to calculate a location corresponding to a map position and transmit said location to said client device. In one embodiment, calculating a location comprises translating a latitude, longitude and zoom factor to an address. The client device may further be operative to re-execute at least one search query based upon said calculated location. In one embodiment, re-executing at least one search query comprises parsing said search query to extract search content and updating a location with said calculated location. Additionally, re-executing at least one search query may be performed asynchronously.

The client device then displays a second search results page comprising a plurality of updated search results. In a first embodiment, displaying a second search results page comprises displaying an updated graphical map comprising a second plurality of search result location markers. In an alternative embodiment, displaying a second search results page comprises displaying a plurality of updated federated search widgets.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE EMBODIMENTS

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
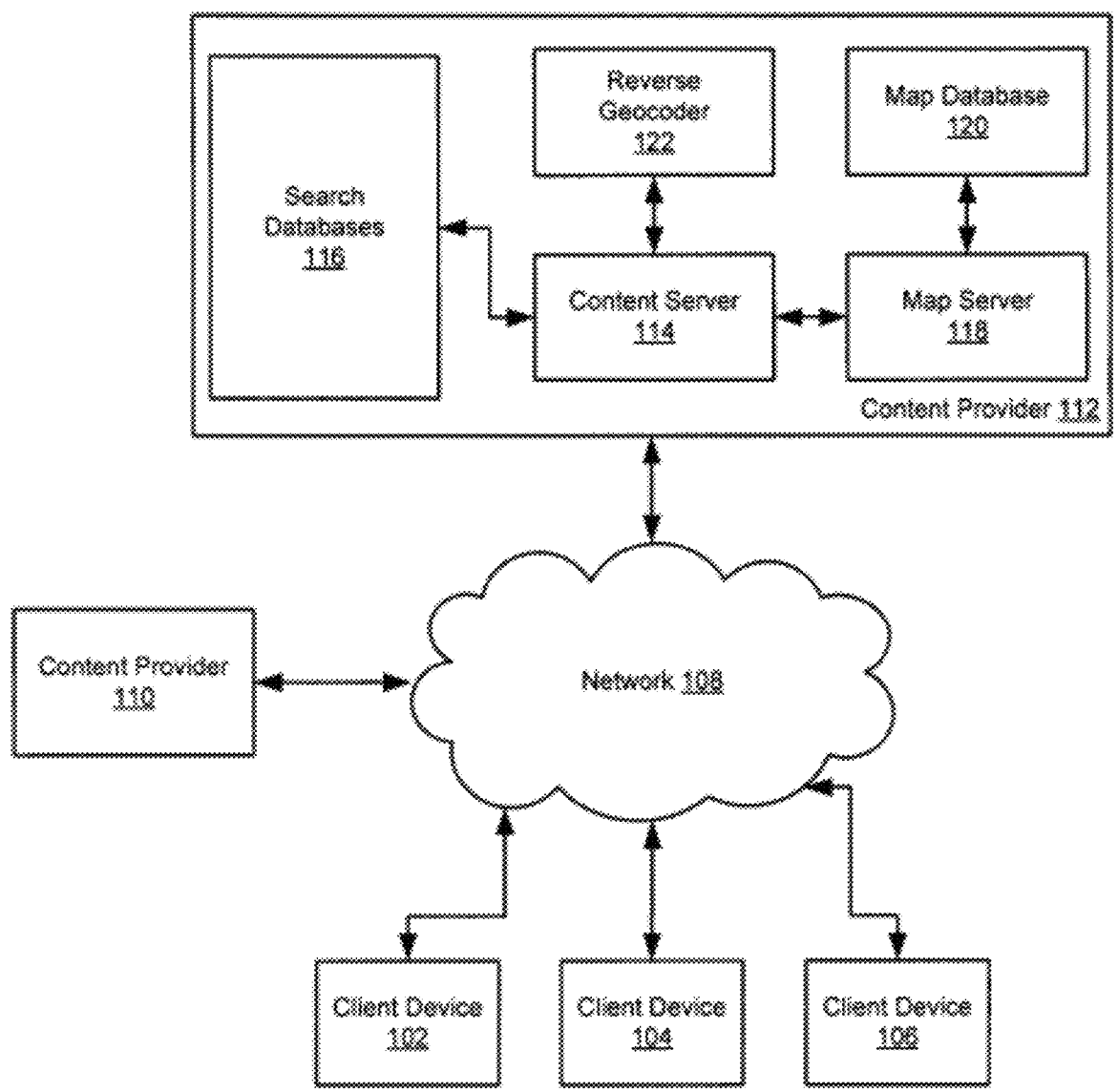
FIG. 1 presents a block diagram illustrating a system for updating a user search query on the basis of user interaction with a map resource according to one embodiment of the present invention.

FIG. 1 presents a block diagram illustrating a system for updating a user search query based on user interaction with a map resource. According to the embodiment illustrated in FIG. 1, one or more client devices 102-106 are communicatively coupled to a network 108, which may include a connection to one or more local and wide area networks, such as the Internet. According to one embodiment of the invention, a given client device 102-106 is general-purpose personal computer comprising a processor, transient and persistent storage devices, input/output subsystem and bus to provide a communications path between components comprising the general-purpose personal computer. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminals, mobile handsets, PDAs, etc.

A given client device 102-106 may be in communication with a content provider 112 that hosts one or more content items. The content provider 112 may maintain one or more content servers 114, a given content server 114 hosting one or more web pages. The content provider 112 may also comprise a repository for the storage and transmission of one or more content items in response to a request from a client device 102-106. For example, the content provider 112 may comprise a web site that includes a content server 114 Apache™, Internet Information Server™, etc.) and a plurality of search databases 116, said content server 114 operable to generate a web page in response to a user query submitted by a client device 102-106. The content provider 112 may further maintain program code that, when executed by the content provider 112, is operative to dynamically generate one or more content items.

A given client device 102-106 in communication with the content provider 112 requests a content item that a content server 114 maintains at the content provider 112. Typically, the content server 114 maintains dynamic information at the content provider 112 for delivery to a client device 102-106. For example, where the content server 114 is using the content provider 112 to host one or more web pages, the content provider 112 may provide the HTML or page markup to a given client 102-106, which the content provider 112 may generate dynamically on the basis of program or scripting code that the content server 114 maintains at the content provider 112, e.g., Active Sever Page or Java Server Page code.

According to the illustrated embodiment, a content server 114 generates a federated search results page in response to a user query received from client devices 102-106. Content server 114 generates a federated search results page by querying a plurality of search databases 116 utilizing a received query from a plurality of client devices 102-106. For example, search databases 116 may comprise a plurality of databases including, but not limited to, a standard webpage database, an image database and a video database. Although illustrated as a plurality of databases present within a single content provider 112, in alternative embodiments search databases 116 may be located on alternative content providers coupled to a network 108. Additionally, content server 114 may also query third party databases to provided external content as well as internal content retrieved from search databases 116. The content server 114 generates a federated search page by combining the retrieved results into a single HTML page. According to one embodiment, an HTML page may comprise a plurality of "widgets" containing the received search results.

In addition to retrieving data from the search databases 116, content server 114 communicates a map request to map server 118, which in turn fetches graphical map data from map database 120. In one embodiment, a query for map data may result from a user query having the form "restaurants in New York, N.Y.", "restaurants" comprising the search content and "New York, N.Y." comprising the location. The content server 114 parses the received query and extracts a location from the query, if present. In one embodiment, a content server 114 may simply search a query to find specific words, such as the word "in", and split a query into two components as previously illustrated. In an alternative embodiment, content server 114 may attempt to locate a location string matching at least one regular expression pattern.

Content server 114 extracts the location, if present, from a user query, generates and sends a request to a map server 118. According to the illustrated embodiment, map server 118 is resident on the same content provider 112 as the content server 114, thus a request may simply be calling an additional server-side program to generate map data. In an alternative embodiment, map server 118 may be present on a third-party server, thus content server 114 may generate an HTTP request to transmit the location data to the map server 114 and may receive the data via an HTTP response.

In a third embodiment, a content server 114 may transmit a place holder containing instructions instructing the client device to fetch the map data after a federated search results page has been load. In this embodiment, a content server 114 may send a plurality of HTML and JavaScript commands to a client device 102-106. The JavaScript code may instruct a client device 102-106 to communicate a request for map data to a map server 118. As previously described, map server 118 and map database 120 may be present on either a content provider 112 or a third-party provider 110.

A user may interact with a map element provided in the federated search results page, an interaction including, but not limited to, a re-centering of the map element. For example, a user may enter a search for "restaurants in Sydney" and a plurality of federated search results may be shown as well as a map of Sydney with search results marked on the map. A user may then move the focus of the map to a second city, such as "Dover Heights" and select to search the focused area (Dover Heights) for the same criterion ("restaurants").

According to the illustrated embodiment, when a user selects to re-execute the search at a different position, a search page generates a request containing the latitude and longitude of the focused position. In an alternative embodiment, a zoom level may be transmitted as well. Content server 114 receives the position data via an HTTP header parameter and transmits the position to reverse geocoder 122.

Reverse geocoder 122 receives position data (such as a latitude, longitude and zoom level) and translates the position data into a location (for example, a position of 40.degree.43'"N 74.degree.00'"W may be translated to "New York, N.Y."). According to one embodiment, a reverse geocoder 122 may submit a request to a third party geocoding service, such as "Where on Earth?", to translate position to location.

The reverse geocoder 122 then returns the location corresponding to a submitted position to content server 114. The content server 114 then returns the location to the client devices 102 to 106. In one embodiment, a content server 114 may send the location data to the client devices 102 to 106, wherein the client devices 102 to 106 utilize the location data to asynchronously update the federated search modules on the federated search page. In addition to updating the search modules, the map element is updated to reflect the search results for the new location. For example, a map original displaying results for the query "restaurants in Sydney" may now display results for a query "restaurants in Dover Heights, NSW, Australia".

Figure 2:
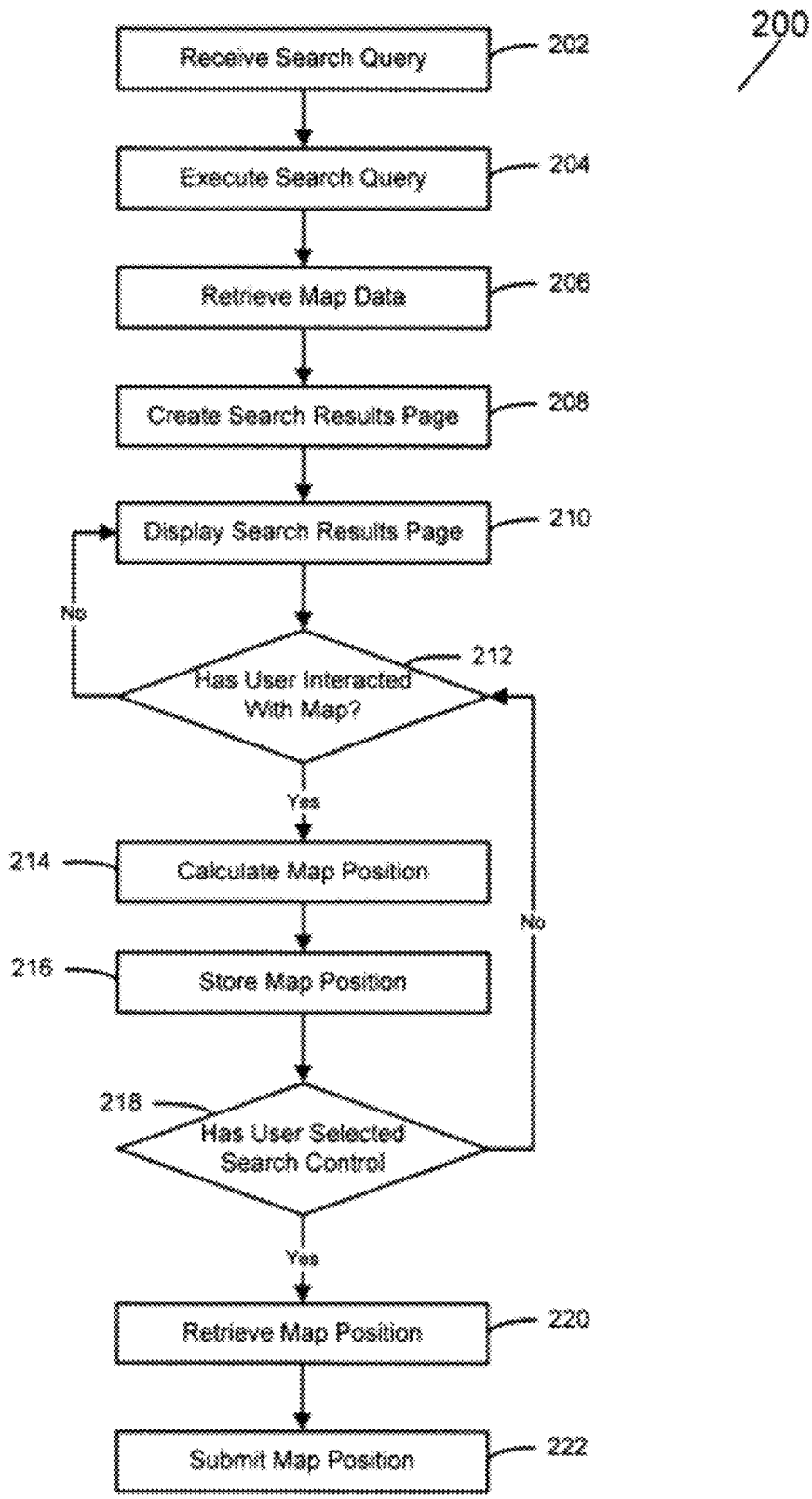
FIG. 2 presents a flow diagram illustrating a method for displaying a search results page and transmitting a change in map position in response to user interaction according to one embodiment of the present invention.

FIG. 2 presents a flow diagram illustrating a method for displaying a search results page and transmitting a change in map position in response to user interaction. As illustrated, the method 200 receives a search query, step 202. A search query may comprise an HTTP request containing a character string entered by a user into an HTML form element on search engine page.

The method 200 executes the search query, generating a plurality of search results, step 204. In one embodiment, executing a search query may comprise performing a federated search across a plurality of separate databases. For example, a query entered by a user may be simultaneously executed across a variety of databases including, but not limited to, a webpage database, an images database and a video database. In addition to executing a plurality of database searches, map data may be retrieved corresponding to the user query, step 206. In one embodiment, a user may enter a search query having the form of "restaurants in New York, N.Y." where "restaurants" represents the search query and "New York, N.Y." represents the location the user wishes to limit the search results to. In this embodiment, a location is extracted from the search query and map data is retrieved. The retrieved map data may comprise a graphical map of the requested location with a plurality of result markers superimposed on the map data. In an alternative embodiment, map data may be retrieved after a search results page has been returned to a client, as previously discussed.

The method 200 creates a search results page from the federated search results and the map data, step 208, and the search results page is transmitted and displayed on a user device, step 210. If a user does not interact with a map element, the results page displays usual, step 212, unless a user navigates away from the search results page.

However, if a user interacts with a map element, a new map position is calculated, step 214. In one embodiment, a JavaScript function may monitor the user interaction with a map element and may update latitude, longitude and zoom level variables as the user re-centers the map. As a user moves around the map, the map position is stored, step 216. As previously mentioned, in accordance with one embodiment, storing a map position may comprise storing latitude, longitude and zoom level data within a variable resident on the search results page.

A search control is resident on the search results page that allows a user to submit the newly selected location, step 218. In response to selecting the search control, the method 200 may retrieve the stored position data, step 220. In one embodiment, retrieving a stored position variable may comprise retrieve the latitude, longitude and zoom level data from JavaScript variables. After the map position is retrieved, an HTTP request is formed and the map position is submitted to a remote server, step 222. In one embodiment, submitting a map position may comprise asynchronously submitting a map position seamlessly while the search results page remains unchanged.

Figure 3:
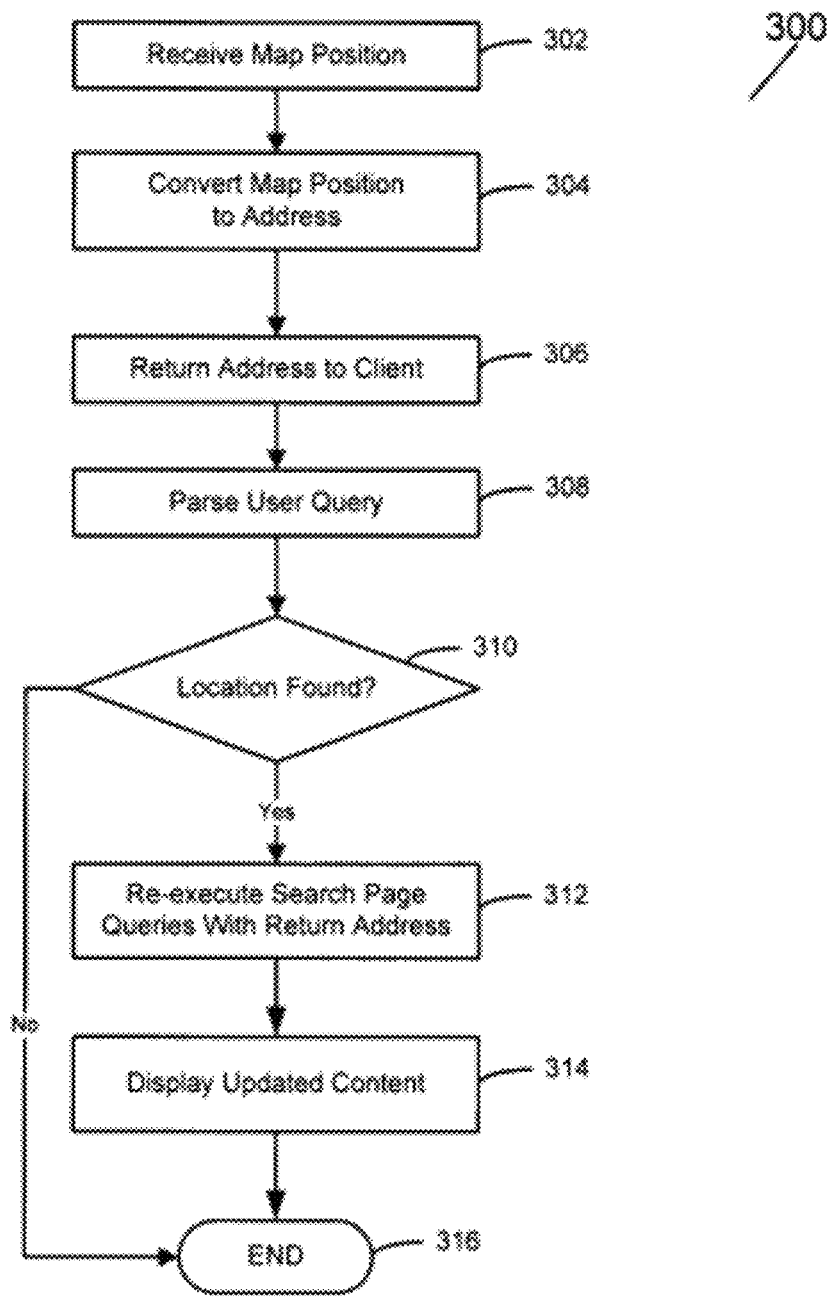
FIG. 3 presents allow diagram illustrating a method for updating a search results page in response to a user map interaction according to one embodiment of the present invention.

FIG. 3 presents a flow diagram illustrating a method for updating a search results page in response to a user map interaction. The method 300 receives a map position, step 302. In one embodiment, a map position may comprise a latitude, longitude and zoom level.

The method 300 converts the map position to a location, such as an address, step 304. In one embodiment, a conversion from position to location may utilize a third party application, such as "Where on Earth?" or a similar service. For example, a position of 40.degree.43'"N 74.degree.00'"W may be submitted to a translation service wherein a translated value of "New York, N.Y." may be returned as a corresponding location. The method 300 then returns the location value to the client, step 306. The location may be passed to the client as an asynchronous response to an asynchronous request. For example, an XMLHttpRequest API may be utilized to request the conversion of position to location in response to a user interaction with a map element.

The method 300 parses the original user query to determine the content of the user query, step 308. In one embodiment, JavaScript resident on a search results page retrieves the user query from the page itself. For example, the current user query may be extracted from the current URL of the page, or from a JavaScript variable present within the page. If no location was returned in step 306, the method 300 ends, step 316, and the currently displayed search results page is not updated.

If a location is returned to the client device, the search page queries are re-executed using the returned address, step 318, and the method 300 displays the updated content, step 320. According to one embodiment, re-executing the search page queries may comprise formulating a new query based on the existing parsed query and the newly received location parameter. For example, an original query of "restaurants in New York, N.Y." may be parsed to extract the "restaurant" from the original query. Additionally, the method 300 utilizes the received location data (e.g., "Boston, Mass.") to generate a new query string, for example "restaurants in Boston, Mass.".

The requests for new content may comprise a plurality of asynchronous requests for content using the newly generated query. For example, a search page comprises a plurality of widgets containing federated search content. The search page may be operative to update a given widget with new content based on the generated query without refreshing the entire search results page.

Figure 4:
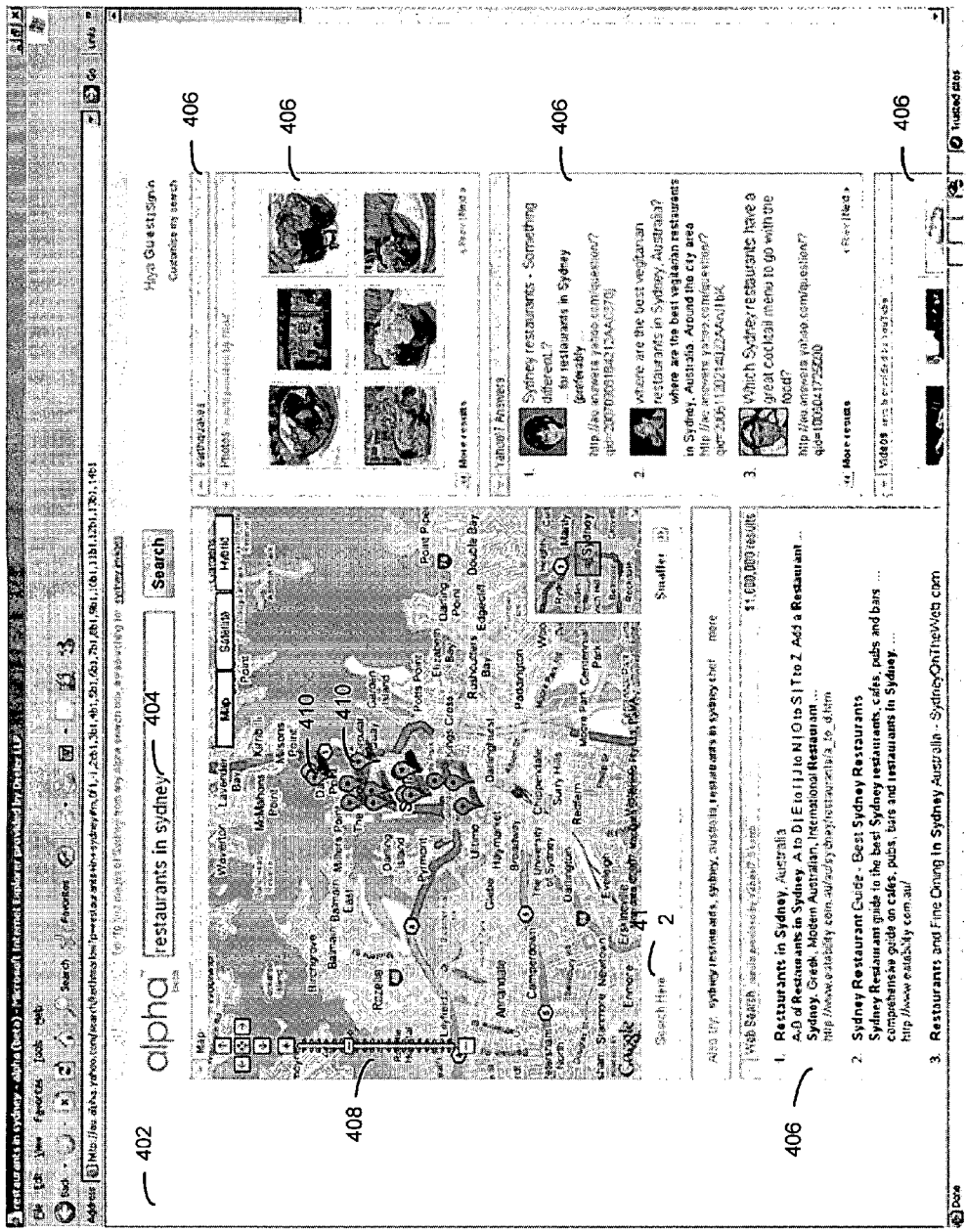
FIGS. 4 through 6 present screen diagrams illustrating user interfaces for presenting updates to a user search query on the basis of user interaction with a map resource according to one embodiment of the present invention.

FIG. 4 presents a screen diagram illustrating a federated search results page comprising a map resource. According the illustrated embodiment, a search results page 402 is provided in response to a user query 404.

A search results page 402 comprises a plurality of federated search widgets 406 containing search results corresponding to the received query 404. Federated search widgets 406 may be populated at the server prior to the transmission of the search results page 402, or may be populated after the search results page has been received via an asynchronous request for the search content.

In addition to the plurality of federated search widgets 406, a map resource 408 may be displayed on the search results page 402. A map resource 406 may comprise an AJAX resource that allows a user to drag and zoom a graphical map. Map resource 406 also comprises a plurality of "push pins" 410 indicating the location of search results returned in response to a user query 404. A map resource 408 may be coupled with a "Search Here" button 412. A "Search Here" button 412 is operative to allow a user to re-execute the current query 404 with a newly selected position as will be illustrated with respect to FIGS. 5-6.

Figure 5:
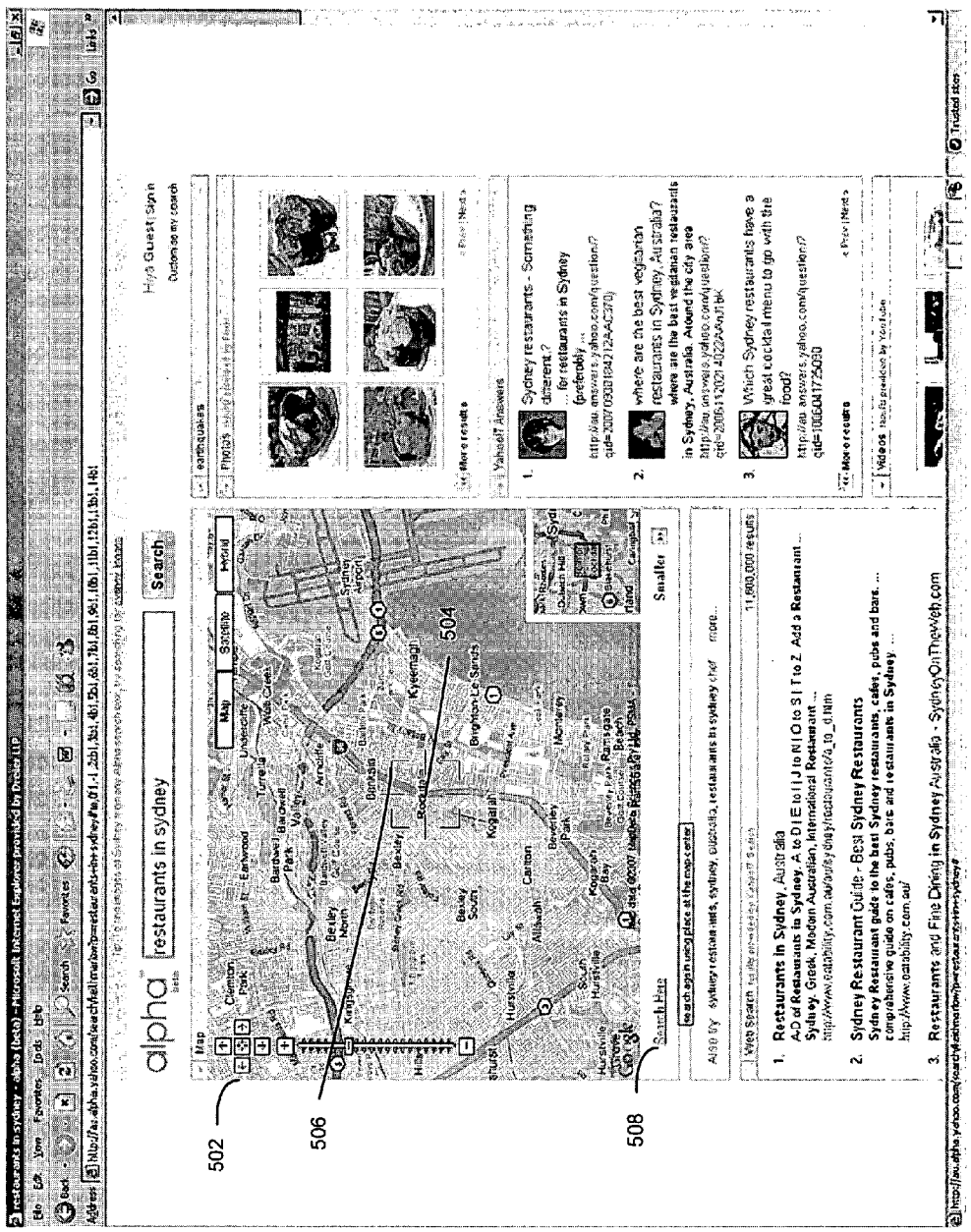

FIG. 5 presents a screen diagram illustrating repositioning a map resource on a search results page. According to the illustrated embodiment, a user repositions a map resource 502 to be centered on a new location 504. In one embodiment a user may click and drag the graphical map to reposition the view of the map resource 502 to a desired location.

The map resource 502 monitors the position of the center of the map by monitoring the change in position of the mouse and the map resource 502. The position is represented as a set of coordinates including latitude, longitude and zoom factor. The position is stored within a local variable present on the search results page. In one embodiment, these position variables are stored within a client-side scripting language construct such as a JavaScript array.

In addition to monitoring the position of the map resource 502, a search results page may further be operative to display a centering guide 506. A centering guide 506 comprises a graphical element operative to inform a user where the center of the map resource 502 is located. In one embodiment, a centering guide 506 may be displayed in response to a user interaction, such as a mouseover of a "Search Here" link 508.

Figure 6:
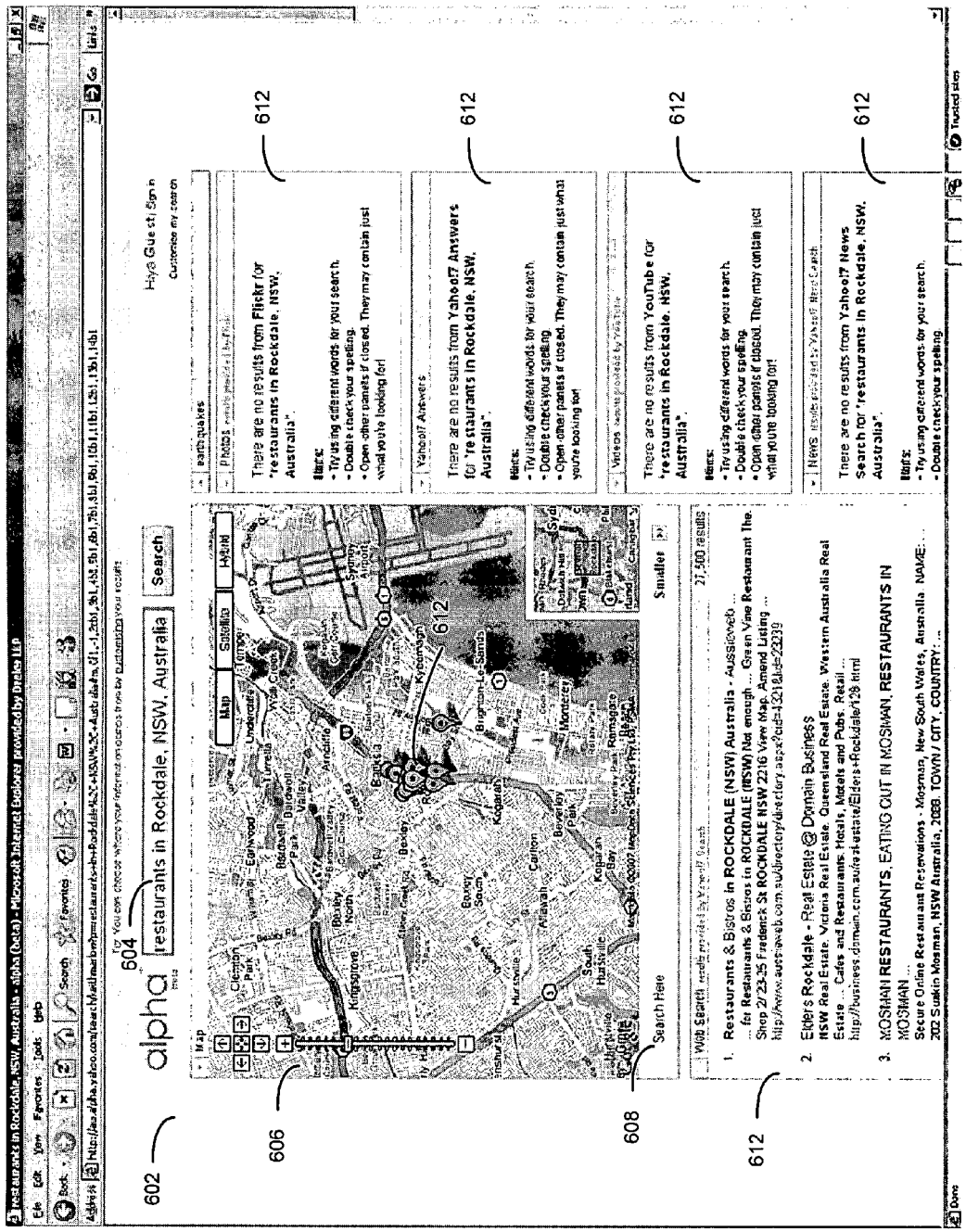

FIG. 6 presents a screen diagram illustrating a search results page provided in response to selecting a second location on a map resource. According to the illustrated embodiment, a second search results page 602 is displayed in response to an interaction with a map resource 606.

As illustrated, a user has moved the map resource 606 to center on the city of Rockdale. As previously described with respect to FIG. 5, a user may select a "Search Here" link 608 to update the search results page 602 with respect to the new location. In response to that selection, a new query 604 is executed ("restaurants in Rockdale, NSW, Australia"). As illustrated, the original query "restaurants in Sydney" has been replaced with a query containing a new location "Rockdale, NSW, Australia" as previously described with respect to FIGS. 2 and 3.

The newly executed query updates a plurality of elements on the search results page 602 including a plurality of map search results 610 and a plurality of federated search widgets 612. As can be seen from the illustrated embodiment of FIG. 6, a plurality of updated push pins 610 are superimposed on a map resource 606. The updated push pins 610 are retrieved in response to a plurality of updated query results generated from the new position. In addition to updating a map resource 606 a plurality of federated search widgets 612 are updated with new content retrieved in response to an updated query location.

FIGS. 1 through 6 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any trial in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

The invention claimed is:

1. A method for updating a search result page, the method comprising:
   receiving a search request from a user requesting a content item associated with a first location;
   retrieving one or more first search results and first map data related to the first location;
   generating one or more widgets based on the one or more first search results;
   generating a search result page including the one or more widgets and a first map with the geographic locations of the one or more first search results displayed thereon;
   monitoring a change in position of the first map in response to a user interaction with the first map;
   determining a second location relative to the first location in response to the change;
   generating a search query requesting the content item associated with the second location;
   retrieving one or more second search results and second map data related to the second location; and
   updating the search result page based on the one or more second search results and the second map data.

2. The method of claim 1 wherein generating the search result page comprises displaying a federated search result page comprising one or more first search results from a plurality of search databases.

3. The method of claim 1 wherein the first map comprises a graphical map and location markers corresponding to the one or more first search results.

4. The method of claim 1, wherein updating the search result page based on the one or more second search results and the second map data further comprising:
   updating the first map with the second map data to display the geographical locations of the one or more second search results; and
   updating a given widget only if the first search results included therein need to be updated.

5. The method of claim 1 wherein the search query requesting the content item associated with the second location comprises a plurality of asynchronous requests, each directed to a given widget that needs to be updated.

6. The method of claim 1 further comprising receiving a latitude, a longitude, and a zoom level of the first map.

7. The method of claim 1, further comprising providing a user interface for the user to determine whether to update the search result page.

8. The method of claim 1, further comprising presenting the search query in the search result page to the user.

9. The method of claim 1, wherein the user interaction comprises clicking and dragging of the first map.

10. A system for updating a search result page, the system comprising:
    a client device coupled to a network, the client device operative to:
    receive a search request from a user requesting a content item associated with a first location;
    retrieve one or more first search results and first map data related to the first location;
    generate one or more widgets based on the one or more first search results;
    generate a search result page including the one or more widgets and a first map with the geographic locations of the one or more first search results displayed thereon;
    monitor a change in position of the first map in response to a user interaction with the first map;
    determine a second location relative to the first location in response to the change;
    generate a search query requesting the content item associated with the second location;
    retrieve one or more second search results and a second map data related to the second location; and
    update the search result page based on the one or more second search results and the second map data.

11. The system of claim 10 wherein the search result page comprises a federated search page comprising one or more first search results from a plurality of search databases.

12. The system of claim 10 wherein the first map comprises a graphical map and location markers corresponding to one or more first search results.

13. The system of claim 10 wherein the search result page comprises a centering guide.

14. The system of claim 10 wherein the search query requesting the content item associated with the second location comprises a plurality of asynchronous requests, each directed to a given widget that needs to be updated.

15. The system of claim 10 wherein the client device is further operative to receive a latitude, a longitude, and a zoom level of the first map.

16. The system of claim 10, wherein the client device is further operative to
    update the first map with the second map data to display the geographical locations of the one or more second search results; and
    update a given widget only if the first search results included therein need to be updated.

17. A machine-readable tangible and non-transitory medium having information for updating a search result page, wherein the information, when read by the machine, causes the machine to perform the following:
    receiving a search request from a user requesting a content item associated with a first location;
    retrieving one or more first search results and first map data related to the first location;

generating one or more widgets based on the one or more first search results;

generating a search result page including the one or more widgets and a first map with the geographic locations of the one or more first search results displayed thereon;

monitoring a change in position of the first map in response to a user interaction with the first map;

determining a second location relative to the first location in response to the change;

generating a search query requesting the content item associated with the second location;

retrieving one or more second search results and second map data related to the second location and;

updating the search result page based on the one or more second search results and the second map data.

18. The medium of claim 17 wherein generating the search result page comprises displaying a federated search result page comprising one or more first search results from a plurality of search databases.

19. The medium of claim 17 wherein the first map comprises a graphical map and location markers corresponding to the one or more first search results.

20. The medium of claim 17 wherein the search result page comprises a centering guide.

21. The medium of claim 17, the information, when read by the machine, further causing the machine to receive a latitude, a longitude, and a zoom level of the first map.

\* \* \* \* \*